United States Patent
Hardin

(10) Patent No.: US 7,729,713 B1
(45) Date of Patent: Jun. 1, 2010

(54) METHODS FOR PROVIDING MOBILE PTT COMMUNICATIONS WITHOUT REQUIRING PTT SERVERS

(75) Inventor: Stephen T. Hardin, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1062 days.

(21) Appl. No.: 11/252,114

(22) Filed: Oct. 17, 2005

(51) Int. Cl.
H04B 7/00 (2006.01)
H04Q 7/20 (2006.01)

(52) U.S. Cl. .................. 455/519; 455/518; 455/517; 455/416

(58) Field of Classification Search .............. 455/518, 455/519, 520, 517, 415, 516, 521, 509, 452.1, 455/515; 370/352
See application file for complete search history.

(56) References Cited

U.S. PATENT DOCUMENTS

2004/0266468 A1* 12/2004 Brown et al. ............... 455/518
2005/0124367 A1* 6/2005 Hassan et al. ............... 455/518
2005/0180394 A1* 8/2005 Kautz et al. ................. 370/352
2006/0063553 A1* 3/2006 Iyer et al. .................... 455/519

* cited by examiner

*Primary Examiner*—John Lee
(74) *Attorney, Agent, or Firm*—Parks IP Law LLC; Mickki D. Murray, Esq.

(57) ABSTRACT

A push-to-talk communications device (PCD) provides improved push-to-talk (PTT) communications. The PCD may include a PTT activator and a PTT module having a buffer and communications logic for providing full duplex PTT communications. In a Point-to-Point PTT mode of operation, PTT communications are performed between two PCDs with the PCDs exercising floor control. After the establishment of communications between the PCDs, the PCDs may enter a PTT talk mode wherein messages are transmitted between the PCDs in real time when a PTT activator is engaged. A PCD may also enter a group PTT mode wherein a PTT server exercises floor control between an initiating PCD and multiple target PCDs.

28 Claims, 7 Drawing Sheets

METHODS FOR PROVIDING MOBILE PTT COMMUNICATIONS WITHOUT REQUIRING PTT SERVERS

FIELD OF INVENTION

This invention relates in general to mobile communication devices. In particular, this invention relates to a device and method for providing Push-to-Talk (PTT) communication.

BACKGROUND OF INVENTION

A Push-to-Talk (PTT) mode of communication is designed to minimize the delays associated with communicating between communication devices, so as to provide near-instantaneous connectivity. Typically operating in a half duplex channel configuration, which allows one communication device to transmit at a time, a communication device operating in a PTT mode may transmit to a single receiving terminal, or to a group of receiving communication terminals.

A simple example of a known PTT system is a set of two walkie-talkies. In this PTT system the walkie-talkie transmits at a particular frequency to another walkie-talkie, which is tuned to the same frequency. When the walkie-talkie transmit or talk button is depressed, the user may speak and transmit over his walkie-talkie. When the talk button is released the walkie-talkie does not transmit, but may receive transmissions from the other walkie-talkie. Because there is no network involved here, there are no time delays associated with the initiation and completion of a communication link. The significant drawback of such a system, however, is the limited operational range; normally the system does not operate when the distance between terminals exceeds about a mile.

A trunked communication system such as a cellular network may be used to support PTT mode communications. A typical PTT system 100 implemented over a cellular network, as known in the art, is depicted in FIG. 1, which shows a first communication device CD 110 transmitting to a second communication device CD 115. This PTT call is transmitted wirelessly to a first Base Station System (BSS) 120. From the BSS 120, the call request is routed to a first Mobile Switching Center (MSC) 130, which is associated with the BSS 120 serving the CD 110. The MSC 130 then routes the call to a PTT server 140, which is responsible for contacting the intended recipient and establishing floor control for the communications channel. When the CD 110 transmits over the assigned traffic channel, the PTT server 140 routes the call via a second MSC 150 and a second BSS 160 to the intended receiving communication device CD 115.

PTT communication networks, as currently implemented, are expensive and inefficient for conducting PTT calls between communications devices. The inclusion of a PTT server necessary for floor control in the known networks, introduces several time delays into the overall system performance. The user of the initiating communication device must wait for a PTT request to be sent to the PTT server 140, and wait for a responding acknowledgement, typically a chirp, prior to beginning to speak. Thus, there is a delay associated with contacting and receiving acknowledgement from the PTT server 140 before the user can begin to speak a message.

In addition to introducing time delays in the communications link, a PTT server necessitates the use of additional network resources. In a trunked communications system, channels are allocated and shared among multiple users according to need and availability. In the PTT network described above, a PTT server is an integral component of the communications network regardless of the number of targeted recipients. The inclusion of the PTT server necessitates the formation of additional trunk lines and allocation of network resources for establishing a communication connection between two communication devices, which could be performed by a standard cellular network without assistance from a dedicated PTT server.

A third disadvantage of a PTT server is that the receiving party may not cut in and speak while the sending party is speaking. The PTT server exercises floor control over the channel so that one communication device may not transmit over the PTT channel while another communication device is transmitting.

SUMMARY OF INVENTION

The present invention provides an apparatus, system, and method for providing PTT communication in a more timely and efficient manner than is currently practiced in the art. In one embodiment a PTT communication device (PCD) is provided that allows for PTT communication over a trunked communication system without employing a PTT server, thereby minimizing the number of trunk lines necessary for facilitating the PTT call and reducing the time delays experienced by the users. The PCD may include a PTT activator and a PTT module, including a buffer for buffering the user's speech and software instructions for interacting with the network and maintaining floor control. Accordingly, a PTT call from a PCD may be established via a mobile communication network and subsequent floor control functions are exercised by the participating PCDs. In another embodiment when engaging in group PTT communication facilitated by a PTT server, the PCD still mitigates time delays in creating and receiving a message.

In another embodiment of the present invention, a method of conducting PTT communication exercised by an initiating PCD (IPCD) may include: activating a PTT initiation mode, receiving a target PCD (TPCD) identification from a user, initiating a communication path to the TPCD, accepting a message from a user, buffering the message, receiving a connection acknowledgement from a communication network, and transmitting the buffered message. The IPCD may thereafter enter a PTT talk mode, wherein a message is transmitted in real time when a PTT activator is engaged. In an exemplary embodiment, a PCD in accordance with the invention may perform the following steps when receiving a PTT call: receiving a call request, automatically sending an acknowledgement response, receiving a transmitted message, automatically outputting the message, and thereafter engaging in a PTT talk mode wherein a message is transmitted in real time when a PTT activator is engaged.

PCDs in accordance with the invention may perform the methods described above when engaging in PTT or group PTT communication, thereby reducing time delays even when a PTT server is facilitating the communication. For PTT, the TPCD is a single communication device, the IPCD receives an acknowledgement from the TPCD, PTT communication is performed without a dedicated PTT server, and the IPCD and TPCD exercise floor control. For group PTT communication, the TPCD is a group, an acknowledgement is received from a PTT server, the PTT server establishes connections with the targeted recipient communication devices, and the PTT server exercises floor control over the channel.

In accordance with the invention, a PTT communication link may be conducted between two PCDs over a conventional communication channel via a cellular network, without involving a PTT server. Communication over the link is performed in a PTT manner by the IPCDs; in that a PTT activator at the PCD is engaged in order to transmit over the communication channel.

A system incorporating a PCD according to the present invention allows a user to begin speaking shortly after activating a PTT initiation mode, without waiting for a network-generated acknowledgement. This "speak-on-demand" feature provides an advantage over contemporary PTT communication systems that rely on a PTT server because there the initiating user is compelled to wait for a chirp from the network prior to speaking. The feature allows a user who is pressed for time to conduct a PTT call at his convenience without waiting for a connection to be established, thereby reducing operator wait time and improving communication efficiency. A PCD in accordance with the invention may include a message buffer to store a message as it is spoken when the PCD is operating in a PTT initiation mode. After an acknowledgement is received at a PCD, the buffered message is transmitted.

Because a TPCD automatically sends an acknowledgement to an incoming PTT call request, connectivity is established prior to the IPCD transmission of a buffered message. As a result, there is no need for a TPCD user to actively answer a PTT call. Instead, a TPCD receives the message and outputs it through a speaker when the TPCD user is available. Not only does a system in accordance with the invention simplify the PTT communication procedure by obviating the need to actively answer the communication device when the IPCD is transmitting, it also reduces the time necessary to conduct a PTT call by eliminating delays at both the transmitting and receiving ends of the PTT link.

A further advantage of establishing PTT communication by a method according the invention is that the communication channel is a conventional full duplex channel that allows the operator of a receiving communication device to interrupt the operator of a transmitting communication device. This "cut-in" feature is not available in PTT communication facilitated by a dedicated server as practiced in the known art.

The system, methods and devices of the present invention provide point-to-point communication between two communication devices in a manner that reduces costs and decreases the time necessary to conduct the call by eliminating the need for a PTT server, buffering a message while a connection is being established, and providing an auto answer mode in which a communication device automatically connects with an incoming call. Similarly, a system in accordance with the invention may support group PTT communication facilitated by a PTT server in a manner that reduces operator wait time at both the initiating and receiving terminals. Other features and advantages of the invention may be ascertained from the detailed description, the drawings and the appended claims that follow.

DETAILED DESCRIPTION

As is required, detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular components. In other instances, well-known materials or methods have not been described in detail in order to avoid obscuring the present invention. Therefore, specific structural and function details disclosed herein are not limited but serve as a basis for the claims and for teaching one skilled in the art to variously employ the present invention.

Figure 1:
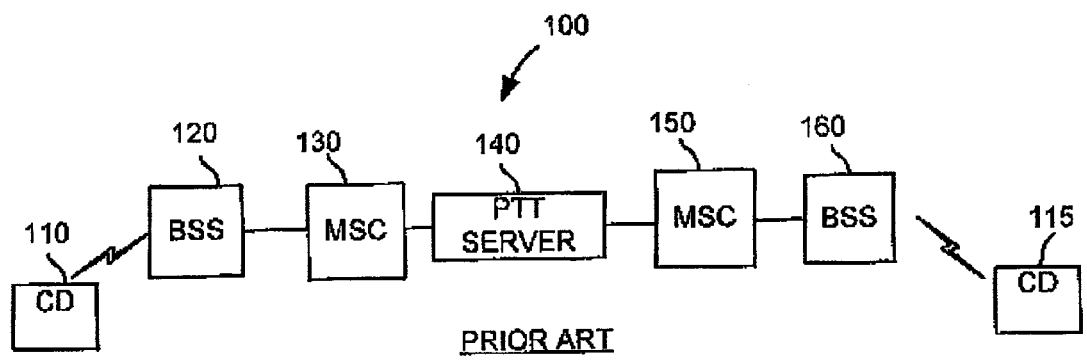
FIG. 1 shows a PTT communication system as known in the prior art.
Figure 2A:
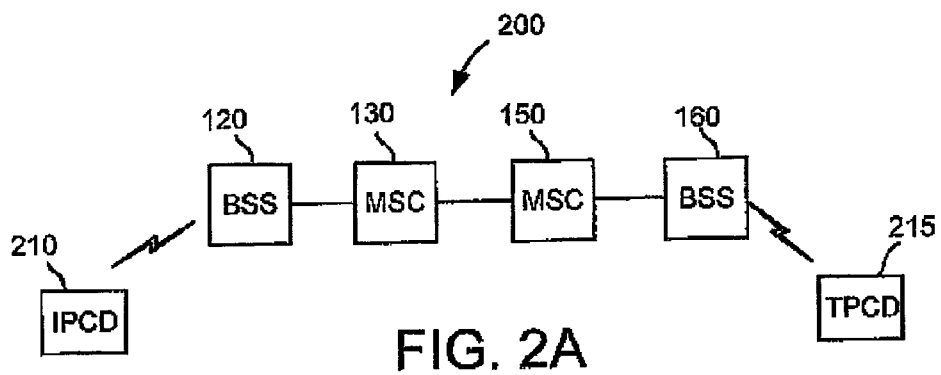
FIG. 2A depicts a PTT communication system in accordance with an exemplary embodiment of the invention.

Referring now to the figures, wherein like numerals reference like elements, FIG. 2A shows a system 200 wherein a push-to-talk (PTT) link is established between an IPCD 210 and a TPCD 215 via a conventional mobile communication network. As illustrated, a system 200 according to the present disclosure is configured to provide PTT functionality without requiring and/or linking through a PTT server. By way of example and not limitation, a PCD in accordance with the invention may be a mobile telephone, a personal digital assistant (PDA) with telephony capability, a smart phone, or any other device configured to transmit and receive a voice signal over a wireless network. IPCD 210 wirelessly transmits to a BSS 120 that forwards the call to a MSC 130. From the MSC 130 the call is routed to a MSC 150 which is associated with a BSS 160 that is serving the area where the TPCD 215 is located. BSS 160 then wirelessly transmits the call to the TPCD 215. Because the system operates without a PTT server, fewer communication paths are required, and the delays associated with contacting a PTT server, which are readily understood by those skilled in the art, are eliminated.

Figure 3:
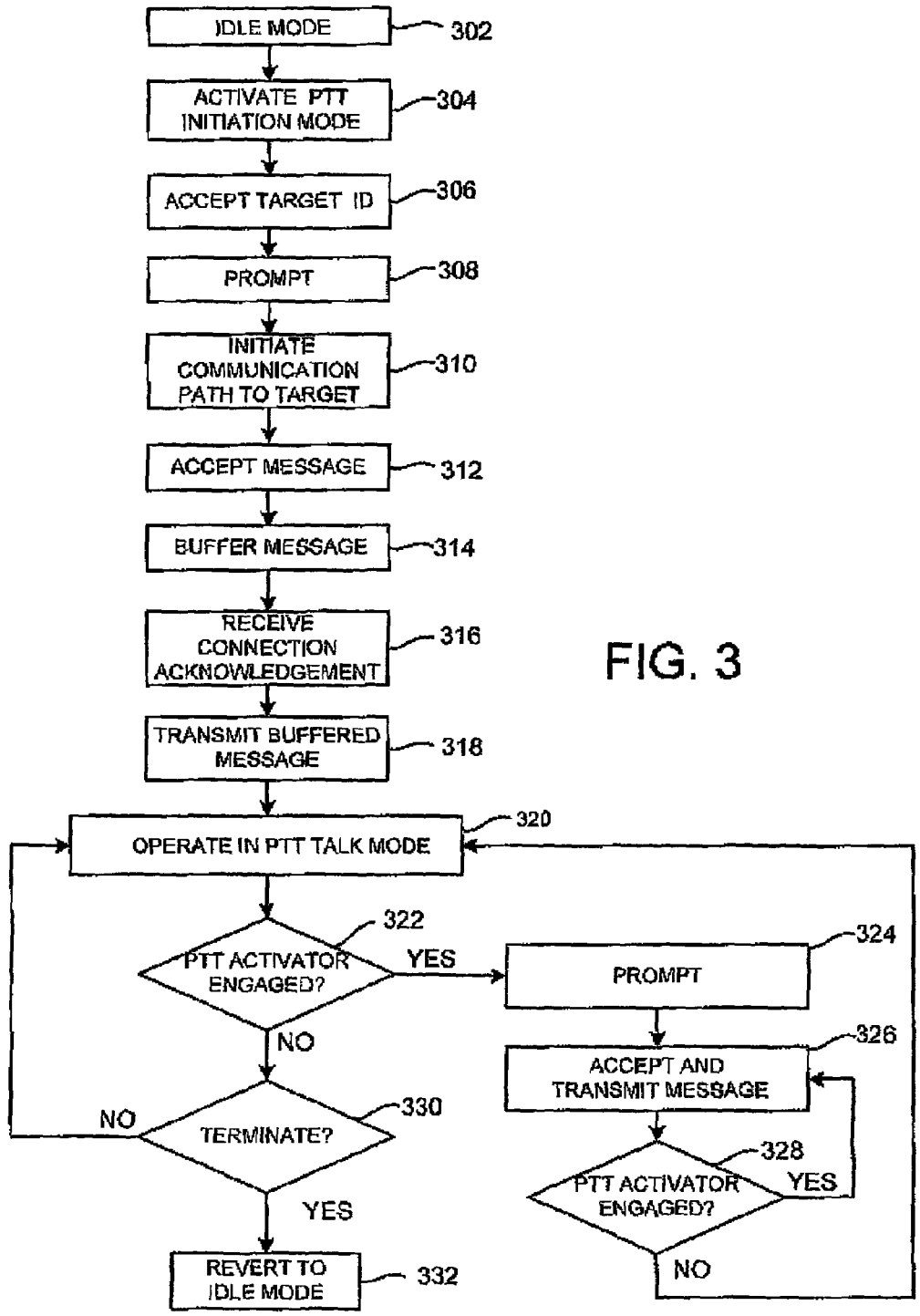
FIG. 3 shows a flow diagram of a method of communication in accordance with an exemplary embodiment of the invention.

FIG. 3 is a flow chart illustrating an exemplary method for implementing PTT communication by an IPCD. Other specific embodiments of the invention may include steps not specifically listed herein. Also, although described in a particular order for purposes of teaching, the steps shown here may be implemented in any combination and order that achieves the purpose of the invention.

The flow chart begins with an IPCD in an idle mode 302, indicating that the IPCD is powered on and is currently not engaged in communication. At step 304 a PTT initiation mode is activated. An initiation mode may be activated by the engagement of a PTT activator on the IPCD. In an exemplary embodiment the PTT activator is a PTT button on the IPCD; alternatively, a PTT initiation mode may be selected from a menu of user options visible on a display screen, or by similar means for activating. At step 306 the IPCD accepts the identification of a TPCD. Identification of a TPCD may be accepted directly after the PTT initiation mode is activated, or it may be accepted after the IPCD queries a user for the identification. Identification of the intended TPCD may be performed by using a keypad to punch in a number, or by accessing a list of names associated with device identifications stored in a database located on either the IPCD or the network.

Figure 2B:
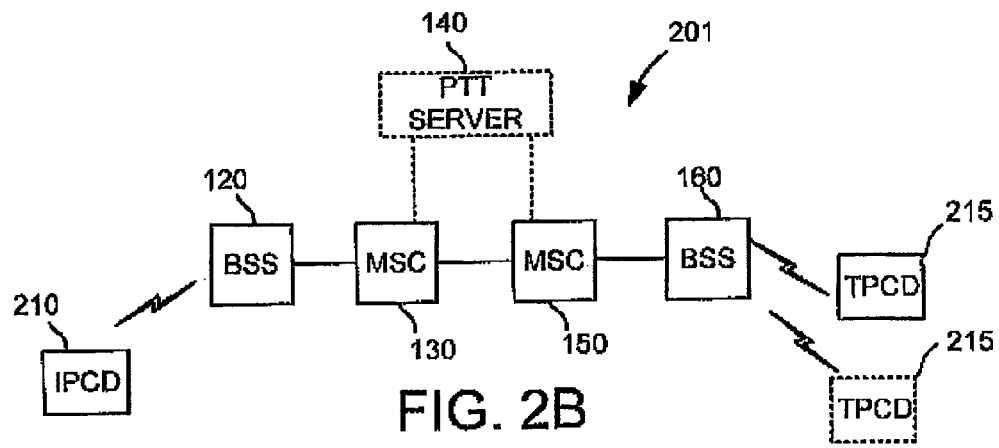
FIG. 2B depicts a PTT communication system in accordance with an alternative exemplary embodiment of the invention.

An IPCD in accordance with the invention may support a group PTT mode, wherein a dedicated PTT server is accessed (as shown in dashed lines in FIG. 2B). Although not specifically shown in FIG. 3, step 304 and/or step 306 may include a substep in which PTT or group PTT communication is designated. If PTT connectivity is designated, the TPCD ID accepted at the IPCD is an identification associated with a single communication device. If group PTT communication is designated, the TPCD may be a group identity; alternatively, multiple recipient identifications may be accepted as a TPCD. An IPCD may also be programmed to route a call request to a PTT server when group mode PTT is designated.

At step 308, the IPCD may generate a prompt that indicates the IPCD is ready to accept a message from a user. In an exemplary embodiment the prompt may be a chirp from the IPCD speaker. Alternatively, a ready state may be conveyed by a visual indicator on the IPCD, such as a text message or icon on a display screen, or a separate visual indicator such as a light. Although included in an exemplary embodiment, step 308 may be excluded in other embodiments. By generating a chirp at the IPCD, as opposed to waiting for a network-generated chirp, IPCD operator wait time is reduced.

At step 310, the IPCD may initiate a communication path to the TPCD. If the IPCD is initiating PTT, a path may be initiated to a single TPCD. If the IPCD is initiating group PTT mode facilitated by a dedicated PTT server, a path may be initiated to the PTT server. At step 312 a message is accepted at the IPCD from the user. In an exemplary embodiment, the message is a voice message spoken by the user while the PTT activator is engaged.

At step 314, the message received at the IPCD at step 312 is stored at the IPCD in a message buffer. In one embodiment, the IPCD message buffer is a recyclable memory buffer of sufficient size to accommodate outgoing messages. In an exemplary embodiment, a voice message accepted at an IPCD microphone is directed to an IPCD message buffer when the IPCD operates in a PTT initiation mode and a PTT activator is engaged.

At step 316, an acknowledgement confirming connectivity is received at the IPCD. When the IPCD is conducting PTT, the acknowledgement may originate at the TPCD. Alternatively, if the IPCD is operating in a group PTT mode, the received acknowledgement may originate at a PTT server (as shown in dashed lines in FIG. 2B). After an acknowledgement is received at step 316, at step 318 the IPCD begins transmitting the contents of the message buffer over the established communication channel. As a portion of the buffered message is transmitted, memory space is made available in the IPCD message buffer. Accordingly, during PTT initiation mode operation a message currently being accepted at the IPCD is buffered while a portion of a previously buffered message is transmitted.

In an exemplary embodiment, the PTT activator of an IPCD may be released by a user when a user completes a message. When the IPCD is operating in a PTT initiation mode, transmission of a buffered message may continue after release of the PTT activator until the entire buffered message has been transmitted. When the IPCD PTT activator is no longer engaged, and the IPCD message buffer has been depleted, the IPCD stops transmitting. Alternatively, the IPCD may require that a PTT activator remain engaged until transmission of the buffer contents is completed. In that embodiment, the IPCD may include an indicator that conveys the status of the buffered message transmission, for example complete or incomplete. A status indicator may be an icon or text on a display, a light, or other indicator. In this way a user is advised as to when the PTT activator may be disengaged without affecting message transmission.

After the IPCD PTT activator is released, and the IPCD transmission of a buffered message has been completed, the IPCD operates in a PTT talk mode, as shown by step 320. When operating in PTT talk mode, the communication path remains open between the IPCD and the TPCD, and the IPCD may transmit a message in real time, with no pre-transmission buffering, when the PTT activator is engaged. At step 322, a decision regarding PTT activator status is made. If a PTT activator is engaged, the IPCD may provide a prompt, such as a chirp, at step 324. When an IPCD is operating in PTT talk, a chirp may be generated by the IPCD. In PTT the IPCD-generated chirp indicates to an operator that a PTT activator is engaged and that the IPCD will transmit a message accepted from a user, as shown by step 326. When the IPCD is engaging in group PTT, the chirp may be initiated by a PTT server, and serves as an indication that the IPCD is now allowed to transmit a message accepted from a user over the PTT server-controlled link as shown by step 326. At step 328 a decision is made regarding the PTT activator status of the IPCD. If the PTT activator remains engaged, the IPCD repeats step 326 and continues to transmit a message accepted from an IPCD user. If the PTT activator is no longer engaged, the IPCD does not transmit, but continues in a PTT talk mode, as shown by step 320.

At decision step 322, when the IPCD PTT activator is not engaged, a subsequent decision 330 is made regarding termination. If PTT operation is not terminated, the IPCD continues to operate in the PTT talk mode, described by steps 320 through 328, inclusive. If PTT operation is terminated, the IPCD reverts to the idle mode shown in step 332. In an exemplary embodiment, PTT operation is terminated by the user by pressing an END button on a keypad or by selecting an END option on a menu display. Other means as known in the art may also be used to terminate PTT operation.

Figure 4:
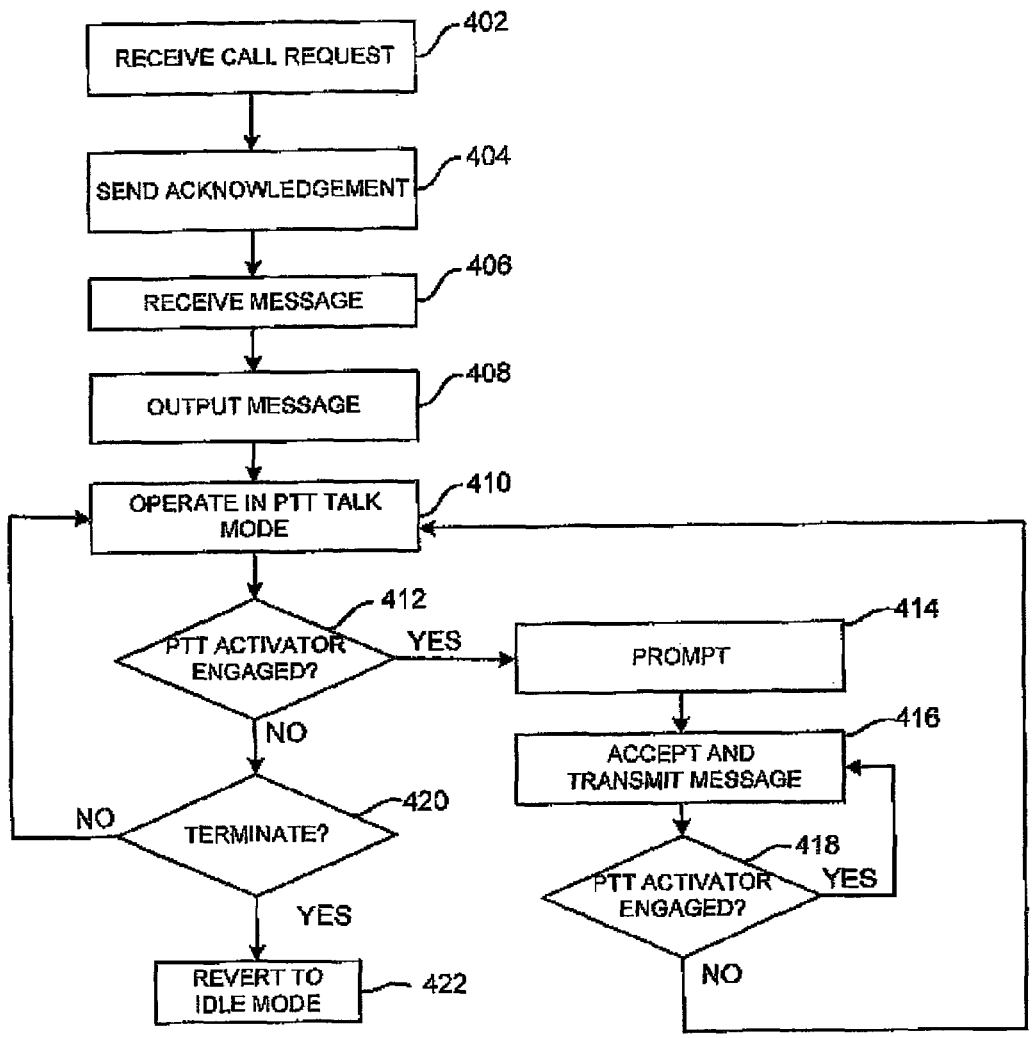
FIG. 4 shows a flow diagram of a method of communication in accordance with an exemplary embodiment of the invention.

Referring to FIG. 4, a flow chart is shown describing the operation of a TPCD in PTT communication with an IPCD. Here, the operation begins at step 402 with the TPCD receiving a PTT call request. For PTT operation, the PTT call request may originate from an IPCD. For group PTT, the call request may originate from a PTT server. In an exemplary embodiment, a TPCD may receive a call request over a control channel. In fact, the call request may be received at the TPCD whether the TPCD is idle or engaged in another communication at the time a call request is received. The TPCD may be programmed to recognize the PTT call request and to respond with an acknowledgement, as shown in step 404, where the TPCD is idle or engaged in another connection. In an alternative embodiment, a TPCD does not accept a call request if currently involved in communication. In that event, the TPCD may receive the call request when it returns to an idle state, immediately responding with an acknowledgement so that connectivity may be established.

At step 406, the TPCD receives a message transmission over a communication channel. At step 408 the TPCD automatically outputs the message to the user. There is no need for the TPCD operator to answer the incoming call since a connection has already been established by the previously transmitted PTT acknowledgment. In an exemplary embodiment a voice message is output at a TPCD speaker. Alternatively the message may be output as text on a display.

After outputting the received message, the TPCD operates in a PTT talk mode, as shown by step 410, in the same fashion as the IPCD. Because steps 410 through and including step 422 are identical to the previously discussed steps 320 through 332, inclusive, a description of these steps will not be repeated.

An advantage of the devices, methods, and systems of the present invention is that quick PTT connectivity can be achieved within the framework of an existing mobile communication network without the need for a dedicated PTT server. A PCD in accordance with the present invention may be configured to perform PIT by including software that replicates PTT functionality and a PTT message buffer at the PCD. A PCD in accordance with the present invention is also compatible with existing mobile communication network architecture and may support traditional non-PTT communication within a mobile network, as well as PTT communication and group PTT communication.

Figure 5:
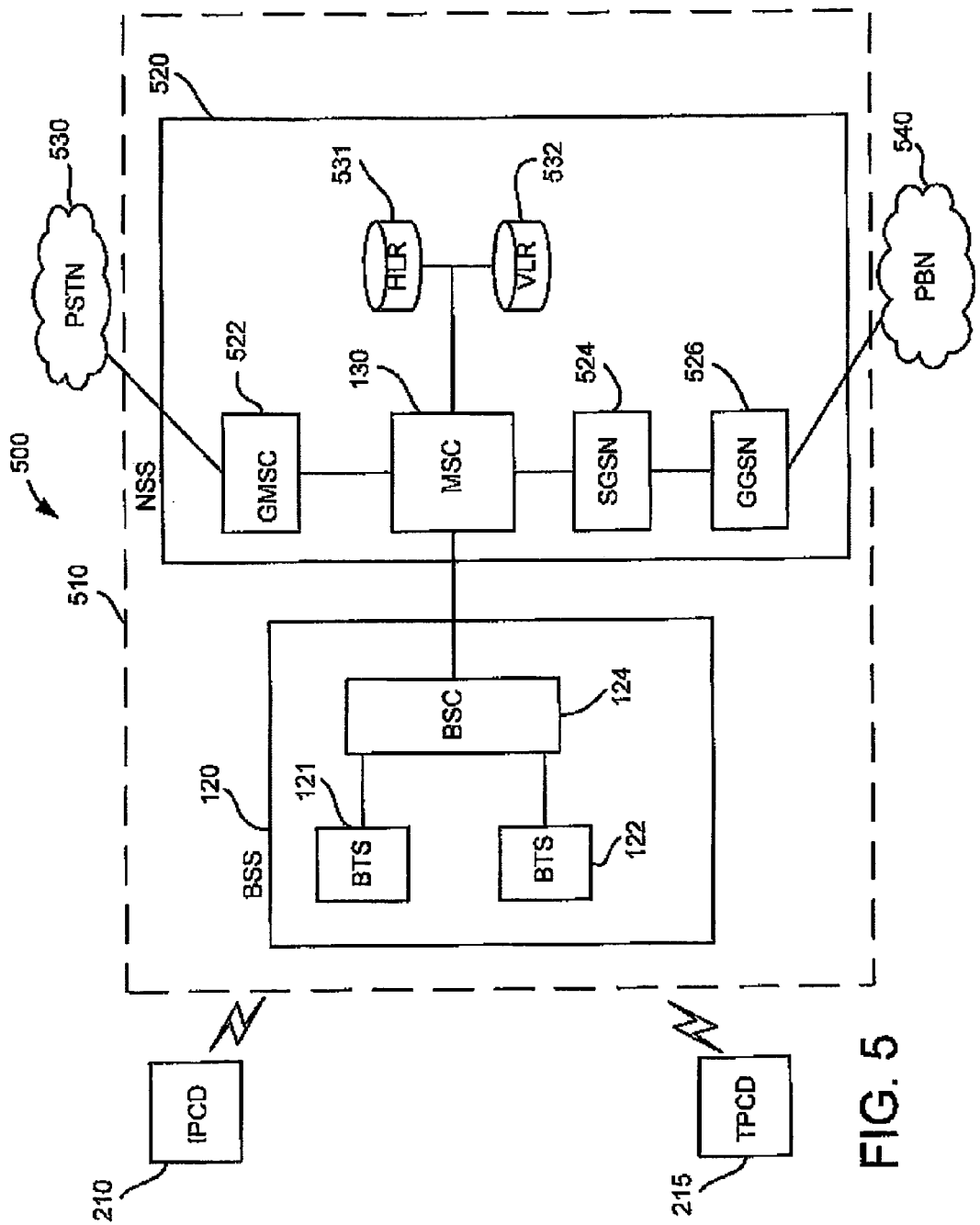
FIG. 5 shows a communication system in accordance with an exemplary embodiment of the invention.

FIG. 5 shows a system 500 in accordance with the invention, wherein IPCD 210 and TPCD 215 communicate over a PTT communication link serviced by a mobile communication network 510. It is noted that although FIG. 5 depicts one network arrangement, service providers may variously design network connectivity, coupling functional entities in a manner different from the one illustrated, but providing similar services.

As known in the art, a mobile communication network 510 may include a Base Status System (BSS) 120 coupled with a Network Switching System (NSS) 520, which may provide access to a Public Switched Telephone Network (PSTN) 530 and a Packet-Based Network (PBN) 540, such as the Internet. A BSS 120 may include one or more Base Transceiver Stations (BTS) 121,122, which communicate with wireless devices. A BSS 120 may also include a Base Station Controller (BSC) 124 for accepting signals from the BTS 121, 122 and forwarding the signal information to a MSC 130. Although not shown in FIG. 5, it is understood that the MSC 130 may communicate with multiple BSSs as well as multiple MSCs.

One function of the MSC 130 is to direct the call to the appropriate network system, i.e. PSTN 530, PBN 540, or BSS 120. To do so, MSC 130 may need to access databases such as a Home Location Register (HLR) 531, or a Visitor Location Register (VLR) 532. HLR 531 may contain subscription and location information regarding subscribers and may manage security data for subscriber authentication. VLR 532 may link to MSCs of other systems to obtain and temporarily store more detailed subscription and location information regarding subscribers currently served by MSC 130.

As seen from FIG. 5, IPCD 210 and TPCD 215 may communicate with a variety of communication devices via the mobile communications network 510. Components of the network include a Gateway Mobile Switching Center (GMSC) 522, a Serving GPRS Support Node (SGSN) 524, and a Gateway GPRS Support Node (GGSN) 526, which operate in a manner well known to those skilled in the art, to connect a PCD to any of the PSTN 530 and PBN 540. If IPCD 210 is calling a mobile device, MSC130 directs the call to a BSS within range of TPCD 215. Depending on the location of TPCD 215, the BSS employed may be the BSS 120 receiving transmissions from IPCD 210, or it may be a different BSS located elsewhere.

Figure 6A:
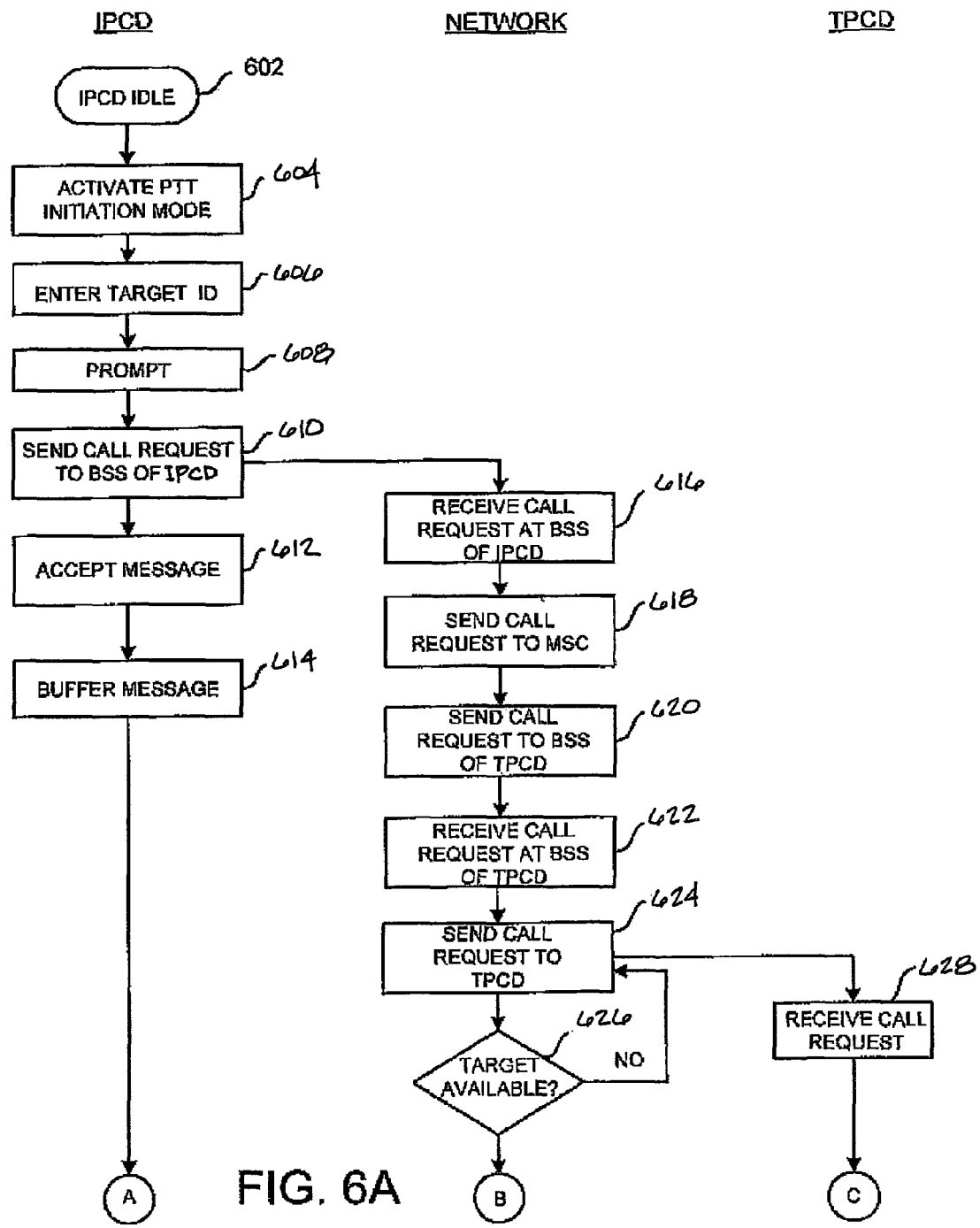
FIGS. 6A and 6B show a flow diagram of a method in accordance with an exemplary embodiment of the invention.
Figure 6B:
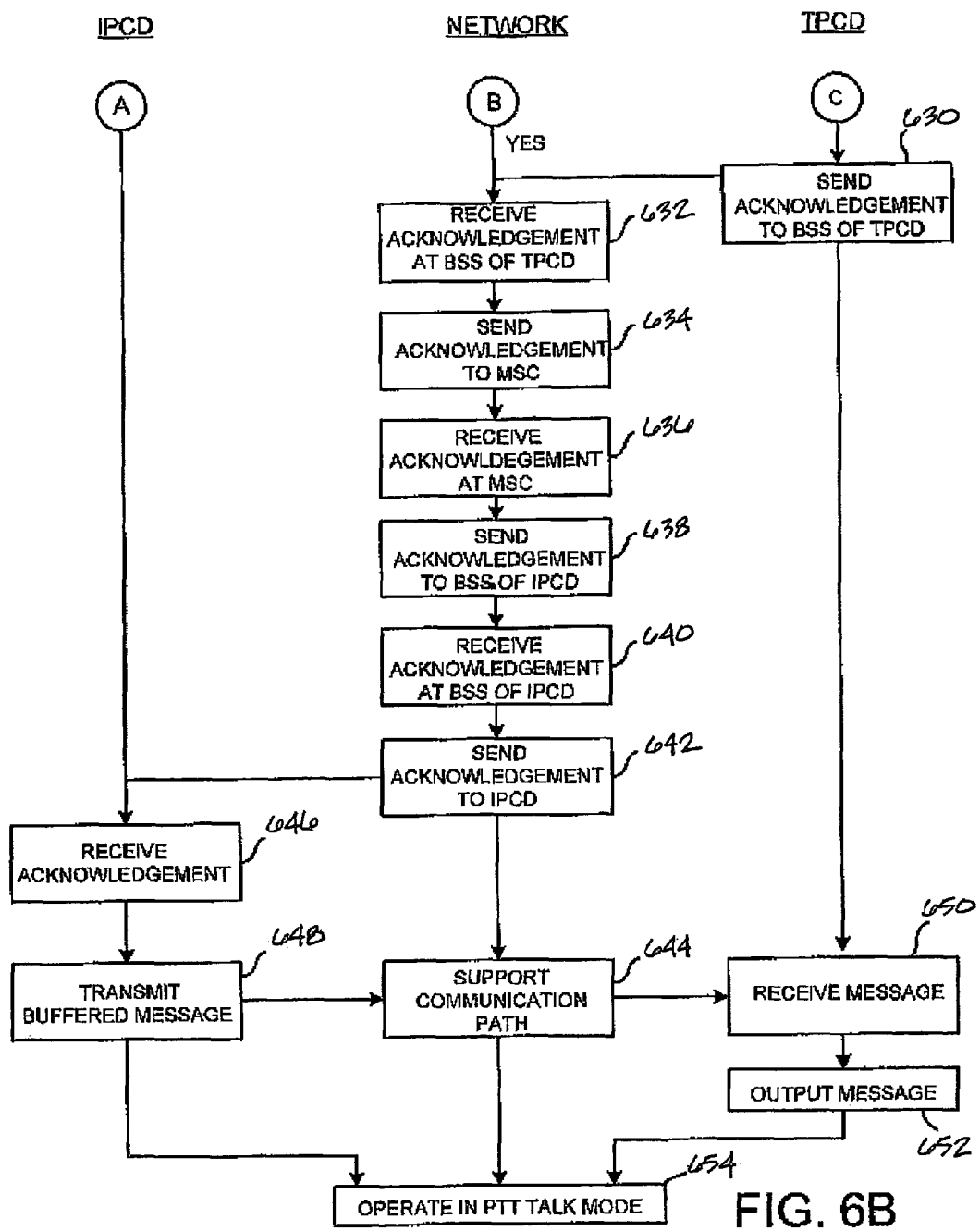

FIGS. 6A, 6B show a flowchart describing an exemplary method of conducting the person-to-person PTT link depicted in FIG. 5. FIG. 6 depicts the flows of IPCD 210, the mobile communications network 510, and the TPCD 215 separately. It will be apparent to those skilled in the art that the order of some of the steps may be altered without straying from the scope of the claims.

The method begins at step 602 with an IPCD 210 in an idle mode. At step 604, the IPCD 210 activates a PTT initiation mode at the request of a user. For example, activation may be accomplished by engaging a PTT activator, by designating a selection from a user menu shown on a display screen, or other methods. At step 606, TPCD 215 is identified as the intended recipient. Identification of the intended recipient at 606 may be performed by receiving input from a user. For example, a user may enter target information using a keypad to punch in a number, or by accessing a list of names from a menu display.

After performing steps 604 and 606, the IPCD 210 may provide a prompt, as shown at step 608, such as a chirp, indicating that a user may begin speaking. In one embodiment, the chirp is generated at IPCD 210 so as to reduce the time the IPCD 210 operator must wait before beginning his message. In prior art PTT communication facilitated by a PTT server, an initiating user does not immediately receive a go-ahead signal generated at the PTT server, but must wait a period of time before beginning to speak. By generating a chirp at IPCD 210, the method of the present invention reduces the operator wait time. For example, the IPCD 210 operator may hear a chirp within 0.5 seconds, rather than 3 or 4 seconds. The chirp indicates that IPCD 210 is ready to implement a PTT call and that the words spoken after the chirp will be stored in a message buffer.

At step 610 the IPCD 210 may submit a call request over a control channel to a nearby BSS 120. Although depicted as occurring after a chirp in an exemplary embodiment, the call request may be sent in conjunction with or prior to the chirp, so as to shorten the time necessary to establish a call.

After hearing a chirp, the IPCD 210 may accept a message from a user, as shown by step 612. In an exemplary embodiment the IPCD 210 user engages a PTT activator while speaking, and as he is speaking the voice message is stored in a message buffer, as shown by step 614. While the IPCD 210 operator is speaking, a communication path between IPCD 210 and IPCD 215 is being established. At step 616, the call request transmitted by the IPCD 210 at step 610 may be received at a BSS within the operational range of the IPCD 210. At step 618 the BSS may decode the call request signal and send content information on to an MSC 130, as shown in FIG. 5. With continued reference to FIG. 5, the MSC 130 may access databases HLR 531 and VLR 532 for subscriber information in order to direct the call request to a proper BSS 120, as shown by step 620. At step 622 the call request is received by the BSS 120.

A BSS 120 may then transmit the call request over a control channel to a TPCD 215, as shown in step 624. The next step in the network flow, step 626, is a decision regarding availability of the TPCD 215. In an exemplary embodiment, the TPCD 215 may receive the call request at step 628 over a control channel regardless of whether the TPCD 215 is currently engaged in communication over a communication traffic channel. A PTT call request may be coded, configured, or transmitted in a particular manner to make it distinguishable from call requests associated with non-PTT calls. The TPCD 215 may be programmed to recognize a PTT call request and to automatically respond with an acknowledgement when the TPCD 215 is available, as shown in step 630. However, even if the TPCD 215 may receive a call request via a control channel when currently engaged in communication, the TPCD 215 may be unavailable because it is turned off.

In an alternative embodiment a TPCD 215 may not receive a call request if currently engaged in another communication. In this case, if the TPCD 215 is not available because it is currently engaged in another communication, or in the case where the TPCD 215 is turned off, a call request signal may be repeated until the TPCD 215 becomes available for communication. Depending on the mobile communication network design, repetition of a call request may be done by the network, by repeating step 624, at the BSS of the TPCD 215 as shown in FIG. 6A, or by repeating step 620 at the MSC 130. Alternatively, if repetition of a call request is not initiated by the network, or if repetition is terminated by the network when the TPCD 215 remains unavailable for an extended period of time, repetition may be initiated at the IPCD 210. In this scenario, the IPCD 210 may be programmed to repeat step 610 if a "not available" signal is received while the PTT mode is engaged. If the network does not provide a "not available" signal to IPCD 210, the IPCD 210 may be programmed to execute particular actions when a predetermined time interval elapses after a call request is transmitted and an acknowledgement has not been received. The IPCD 210 may be programmed to automatically repeat the call request, or to alert the operator that no acknowledgement has been received and accept further instructions from the operator.

The TPCD 215 may be programmed to respond to a received PTT call request with an acknowledgement. The acknowledgement may be transmitted at step 630 when the TPCD 215 is available. In an exemplary embodiment, an acknowledgement from the TPCD 215 may be an in-band tone; however an acknowledgement signal in accordance with the invention may take any form compatible with network 510 and IPCD 210 and TPCD 215. The network receives the acknowledgement signal at a BSS, shown by step 632, and may then forward it to a MSC 130, represented by step 634, where it is received at step 636. At step 638 the MSC 130 forwards the acknowledgement to a BSS within range of the IPCD 210, where it is received at step 640 and transmitted wirelessly to the IPCD 210, as shown by step 642. Once a communication channel has been established between the IPCD 210 and the TPCD 215, transmissions may be conducted via a BSS and MSC 130 as described above. To avoid redundancy, the previously described roles of the BSS and MSC 130 will be assumed as facilitating communication between the IPCD 210 and the TPCD 215, as shown in step 644 of the network flow, but will not be explicitly mentioned in subsequent steps of FIG. 6B.

At step 646, the IPCD 210 receives an acknowledgement. The IPCD 210 may be programmed to transmit the contents of a message buffer over the established communication channel when an acknowledgement is received, as shown in step 648. As the stored information is removed from the buffer, the depleted memory space may be made available; thus the message buffer may be recyclable and may continue to be used to store speech uttered by the operator of the IPCD 210 during the PTT initiation mode. Accordingly, while a portion of a previously stored voice message is being transmitted to the TPCD 215, current speech is being stored.

The message transmitted by IPCD 210 at step 648 is received at TPCD 215, represented by step 650. It is automatically demodulated, decoded, and output to a user at step 652. In an exemplary embodiment a voice message is output through the speaker of the TPCD 215. It is not necessary for the TPCD 215 operator to "answer" the call in order to hear the message. Because the TPCD 215 acknowledgement transmitted at step 630 is used to complete the communication path, TPCD 215 effectively "answers" the call for the user. By automatically sending an acknowledgement to complete a connection, TPCD 215 reduces the time spent transacting the call by eliminating the time spent ringing a communication device and waiting for an operator to answer.

While the TPCD 215 is outputting the transmitted message at step 652, the IPCD 210 may continue to accept a message from a user while transmitting a previously buffered message portion, represented by step 648. In an exemplary embodiment the IPCD 210 will continue to transmit the contents of the message buffer until it has been depleted. In this embodiment the IPCD 210 is programmed to transmit when the PTT activator is engaged, or when a message buffer is not empty. Alternatively, the IPCD 210 may be programmed to transmit only when a PTT activator is engaged. In this embodiment, a status indicator on the IPCD 210 may be used to notify the IPCD 210 operator that the entire message has not been transmitted. The IPCD 210 operator may then continue to engage a PTT activator until the status indicator signifies that the message buffer has been emptied and the transmission is complete. When transmission of the buffered message is completed, and a PTT activator is no longer engaged, the IPCD 210 may stop transmitting. At this point the communication channel remains established and IPCD 210, 215 may continue to operate in a PTT talk mode, as shown in step 654.

In a PTT talk mode in accordance with the invention, either the IPCD 210 or the TPCD 215 may transmit over the communication channel when a PTT activator is engaged. In an exemplary embodiment, the IPCD 210 and the TPCD 215 may be programmed to transmit when a PTT activator is engaged; alternatively, PTT software on the IPCD 210 or the TPCD 215 may control operation of a microphone so that it operates when a PTT activator is engaged. When a PTT activator on the IPCD 210 or the TPCD 215 is engaged, the operator may hear a chirp indicating that he may begin speaking. At this point, voice transmissions may be conducted in real time, without speech buffering, while the operator is speaking. When the operator is finished speaking, he may disengage a PTT activator, thereby terminating his transmission. A communication channel remains established between the IPCD 210 and the TPCD 215 until the PTT talk mode is terminated. In an exemplary method, a user may press an END button, or its functional equivalent, on the IPCD 210 or the TPCD 215 to terminate the PTT connection. Alternatively, depending on the manner in which the communication network 510 operates, the connection may be dropped by a BSS or the MSC 130 when a predetermined interval of time has elapsed since the most recent transmission. After PTT communication is terminated, the IPCD 210 and the TPCD 215 return to an idle mode.

A notable advantage of an exemplary embodiment of the devices, methods, and system of the invention is that one party may "cut in" and speak while another party is transmitting. Since the communication channel arranged by the communication network 510 is actually a full duplex channel, and the IPCD 210 and the TPCD 215 control transmissions over the channel, a user may interrupt the currently speaking party by engaging a PTT activator and speaking. His speech is then transmitted over the communications channel to the other party. A user need not wait for the other party to finish speaking, or wait for a dedicated PTT server to grant the right to transmit over the channel.

The exemplary method depicted in FIGS. 6A, 6B was discussed herein in the context of a PTT call between two PCDs. The devices, methods, and systems of the present invention may support a group mode wherein a dedicated PTT server is used to establish connectivity between an IPCD and multiple recipients. When a group PTT call is designated, an IPCD transmits a call request to a BSS and a MSC 130, which in turn may establish a path to a dedicated PTT server 140. A voice message may be buffered at the IPCD, and then transmitted to a PTT server 140 when an acknowledgement from the PTT server 140 is received. The PTT server 140 may then route the message to the various multiple TPCDs of the PTT group. PCDs in accordance with the invention may be programmed to automatically acknowledge a call request from a PTT server, thereby establishing a connection. When a message is received from a PTT server, it is automatically output to the user without requiring action on the part of the user. Using a dedicated PTT server to facilitate group calls, but not point-to-point calls, is a more efficient delegation of network resources than is currently practiced in the art. The devices and method of the invention may shorten operator time delays associated with conducting group PTT via a dedicated PTT server. The IPCD allows an operator to begin speaking prior to receiving an acknowledgement from the PTT server, reducing operator wait time at the initiation of a group PTT call. A TPCD automatically outputs a received PTT message without necessitating operator intervention, thereby reducing receiving operator wait time.

The devices and methods associated with FIGS. 3, 4, and 6, discussed above in the context of circuit-switched communications, may also be employed with packet-switched communications. As shown in FIG. 5, PCDs in accordance with the invention operate via a communication network 510 that provides connectivity with a packet-based network PBN 540. The steps of engaging a PTT mode at an initiating first communication device, buffering a message at an IPCD 210 as connectivity is being established, and transmitting a buffered message when connectivity confirmation is received at an IPCD 210 may be implemented via a packet-based network. Similarly, a TPCD 215 in accordance with the invention programmed to automatically acknowledge a call request to establish a communication path may automatically output an incoming PTT message to a user without requiring the user to "answer" the call, whether the communication mode is circuit-switched or packet-switched. Accordingly, the systems, methods, and devices of the present invention increase efficiency, mitigate time delays, and reduce costs in the implementation of PTT connectivity for circuit-switched and packet-switched communication.

Figure 7:
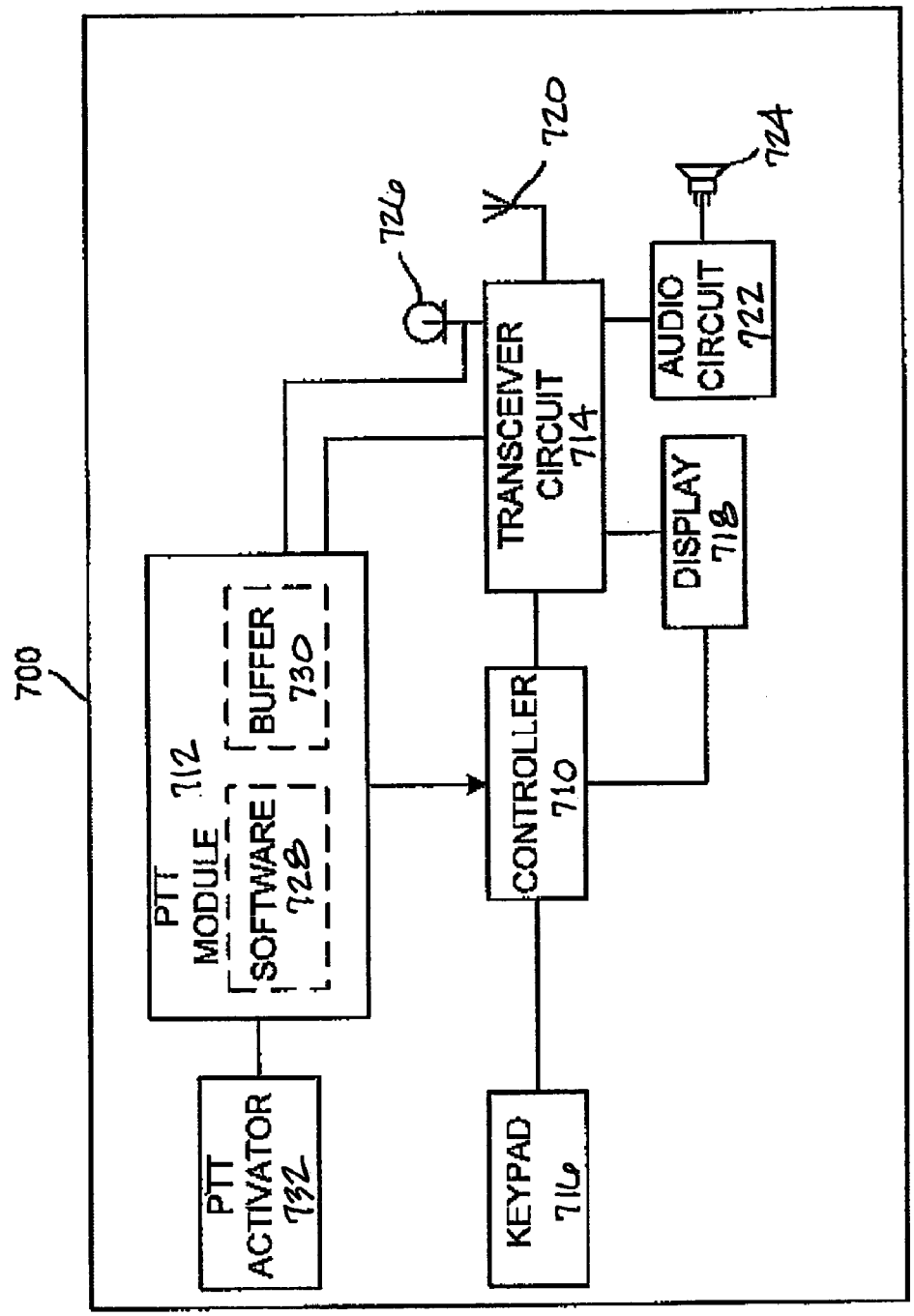
FIG. 7 shows a communication device in accordance with an exemplary embodiment of the invention.

A PCD 700 in accordance with an exemplary embodiment of the invention is shown in FIG. 7. It is noted that the functional blocks depicted in FIG. 7 are for illustrative purposes and are not intended to be interpreted as limitations, as it is understood that the varied functions may be combined or otherwise performed. PCD 700 includes a controller 710, a PTT Module 712 for facilitating PTT communication, and a transceiver circuit 714. Using a keypad 716, an operator may input commands or information to the controller 710, which may respond by generating a display at display 718 and/or activating a transceiver circuit 714. The transceiver circuit 714 is used to transmit and receive voice and data via the antenna 720. The transceiver circuit 714 accepts incoming signals via the antenna 720, demodulates them, and sends audio components to the audio circuit 722, which is coupled with a speaker 724 for outputting sound to a user. Data components of the incoming signal are sent to the display 718. Operator speech is transduced to an electrical signal at microphone 726, modulated at transceiver circuit 714 and output at antenna 720. In an exemplary embodiment, analog/digital conversion, encoding, and other signal manipulation, as understood by those skilled in the art, may be performed at transceiver circuit 714.

PTT module 712 may be used to facilitate PTT communication by communication device 700. PTT module 712 may include software 728 which provides programming instructions for the PTT operation described herein, and a message buffer 730 for buffering a first message by an operator initiating PTT communication. PTT module 712 is coupled with a PTT activator 732, which is used by an operator to engage a PTT mode at communication device 700. By engaging PTT activator 732 to initiate a PTT call, a signal may be sent to PTT module 712. PTT software 728 may then direct controller 734 and transceiver circuit 714 to transmit a call request signal via antenna 726, provide a prompt, such as a chirp heard at speaker 724, and buffer speech signals from microphone 726 at message buffer 730. When a connection acknowledgement is received, PTT software may direct transceiver circuit 714 to transmit the contents of message buffer 730 until the message buffer 730 is depleted. In an exemplary embodiment, PTT operation of transceiver circuit 714 may be governed by PTT software 728 so that when operating in a PTT mode, PCD 700 transmits when a PTT activator 732 is engaged. PTT software 728 also directs controller 734 and transceiver circuit 714 to send an acknowledgement to an incoming call request signal so that a communication connection may be made without requiring operator action. An END button, preferably integrated with keypad 716 may be used to terminate PTT communication.

It must be emphasized that the law does not require and it is economically prohibitive to illustrate and teach every possible embodiment of the present claims. Hence, the above-described embodiments are merely exemplary illustrations of implementations set forth for a clear understanding of the principles of the invention. Many variations and modification maybe made to the above-described embodiments without departing from the scope of the claims. All such modifications, combinations, and variations are included herein by the scope of this disclosure and the following claims.

The invention claimed is:

1. A method for conducting Push-to-Talk (PTT) communication over a communications network without requiring a PTT server, the method comprising:
   initiating, at an initiating communication device, a communication path for PTT communication between the initiating communication device and a target communication device, wherein the communication path does not include a PTT server;
   receiving a message from a user at the initiating communication device;
   storing the message at a storage location associated with the initiating communication device;
   receiving an acknowledgement at the initiating communication device from the target communication device; and
   transmitting the message from the initiating communication device to the target communication device.

2. The method of claim 1 further comprising, the step of activating a PTT initiation mode at the initiating communication device.

3. The method of claim 2, wherein the step of activating a PTT initiation mode comprises receiving a user request for PTT communication.

4. The method of claim 1, further comprising the step of prompting a user to provide a message.

5. The method of claim 4, wherein the step of prompting comprises generating a chirp at the initiating communication device.

6. The method of claim 1, wherein the step of storing a message comprises buffering the message in a message buffer.

7. The method of claim 1, wherein the step of receiving an acknowledgement comprises receiving an acknowledgement via a mobile communication network control channel.

8. The method of claim 1, wherein the step of initiating further comprises detecting that a PTT activator has been engaged.

9. The method of claim 1, wherein:
the PTT communication is circuit-switched communication; and
the communication path is a circuit-switched network path.

10. The method of claim 1, wherein:
the PTT communication is a packet-switched communication; and
the communication path is a packet-switched network path.

11. The method of claim 1, further including the initiating communication device, with the target communication device, exercising floor control over PTT communication.

12. A method for conducting Push-to-Talk (PTT) communication over a communications network without requiring a PTT server, the method comprising:
receiving a call request for PTT communication at a target communication device from an initiating communication device, the call request being received over a communication path that does not include a PTT server;
sending, over the communication path, an acknowledgement from the target communication device to the initiating communication device;
receiving a message from the initiating communication device at the target communication device; and
outputting the message at the target communication device.

13. The method of claim 12, wherein the step of receiving a call comprises receiving a call request via a mobile communication network control channel.

14. The method of claim 12, wherein the step of sending an acknowledgement comprises transmitting an acknowledgement upon availability of the target communication device.

15. The method of claim 12, wherein the step of receiving a message comprises receiving a message over a duplex communication channel.

16. The method of claim 12, wherein:
the PTT communication is circuit-switched communication; and
the communication path is a circuit-switched network path.

17. The method of claim 12, wherein:
the PTT communication is a packet-switched communication; and
the communication path is a packet-switched network path.

18. The method of claim 12, further including the target communication device, with the initiating communication device, exercising floor control over PTT communication.

19. A method of performing Push-to-Talk (PTT) communication over a communications network without requiring a PTT server, the method comprising:
receiving identification of a target communication device at an initiating communication device;
initiating a communication path for PTT communication between the initiating communication device and the target communication device, wherein the communication path does not include a PTT server;
receiving a message from a user at the initiating communication device;
buffering the message at the initiating communication device;
sending, from the initiating communication device, a call request for the initiating communication device;
receiving an acknowledgement from the target communication device at the initiating communication device; and
transmitting the buffered message from the initiating communication device to the target communication device for output at the target communication device.

20. The method of claim 19, wherein the step of receiving identification comprises accepting identification information at a user input device.

21. The method of claim 19, wherein the step of initiating a communication path comprises transmitting a call request from the initiating communication device to the target communication device.

22. The method of claim 19, wherein the step of receiving a call request comprises receiving a call request via a mobile communication network control channel.

23. The method of claim 19, wherein the step of receiving a message further comprises receiving a voice message of a user of the initiating communication device.

24. The method of claim 19, wherein the step of receiving a call request comprises receiving a call request via a mobile communication network control channel.

25. The method of claim 19, wherein the step of transmitting an acknowledgement from the target communication device comprises transmitting an acknowledgement automatically upon availability of the target communication device.

26. The method of claim 19, wherein:
the PTT communication is circuit-switched communication; and
the communication path is a circuit-switched network path.

27. The method of claim 19 wherein:
the PTT communication is a packet-switched communication; and
the communication path is a packet-switched network path.

28. The method of claim 19, further including the initiating communication device, with the target communication device, exercising floor control over PTT communication.

* * * * *